US005944945A

United States Patent [19]

Shinohe et al.

[11] Patent Number: 5,944,945

[45] Date of Patent: Aug. 31, 1999

[54] THERMAL TRANSFER DEVICE

[75] Inventors: Akihiro Shinohe; Junichi Inamura, both of Fukushima-ken; Shuichi Maeda, Saitama-ken; Fujio Matsuishi, Kanagawa-ken, all of Japan

[73] Assignees: Alps Electric Co., Ltd.; Mitsubishi Chemical Corporation, both of Tokyo, Japan

[21] Appl. No.: 08/970,333

[22] Filed: Nov. 14, 1997

[30] Foreign Application Priority Data

Nov. 14, 1996 [JP] Japan .................................... 8-303073

[51] Int. Cl.$^{6}$ ...................................................... B32B 31/00

[52] U.S. Cl. .......................... 156/538; 156/540; 156/582; 156/240

[58] Field of Search .................................... 156/230, 240, 156/538, 540, 582

[56] References Cited

U.S. PATENT DOCUMENTS

| | | | |
|---|---|---|---|
| 3,121,650 | 2/1964 | Meissner | 156/240 |
| 4,060,441 | 11/1977 | Ohta et al. | 156/230 X |
| 5,114,520 | 5/1992 | Wang, Jr. et al. | 156/540 X |
| 5,354,401 | 10/1994 | Asahi et al. | 156/230 |
| 5,397,677 | 3/1995 | Schuerwegen et al. | 430/256 |
| 5,531,854 | 7/1996 | Kerr et al. | 156/234 |

FOREIGN PATENT DOCUMENTS

| | | |
|---|---|---|
| 2-44549 | 2/1990 | Japan . |

*Primary Examiner*—James Engel
*Attorney, Agent, or Firm*—Brinks Hofer Gilson & Lione

[57] ABSTRACT

A thermal transfer device including a transfer roller and transporting portions that are spaced apart from and oppose each other; a heating member for heating surface of the transfer roller; a tray for placing thereon a member, being an optical recording-medium, to be subjected to transfer; and a transfer sheet with a transferring portion formed by printing, wherein the tray carrying the transfer sheet and the member to be subjected to transfer Such that the transferring portion faces the member is transported between the transfer roller and the transporting portions with the transfer sheet in contact with the transfer roller, whereby the transferring portion of the transfer sheet is thermally transferred onto the member. The thermal transfer device is capable of providing good quality printing at all times as a result of forming the transferring portion of the transfer sheet by printing, followed by thermal transfer of the transferring portion onto the member being an optical recording medium.

17 Claims, 5 Drawing Sheets

THERMAL TRANSFER DEVICE

BACKGROUND OF THE INVENTION

1. Field of the Invention

The present invention broadly relates to a thermal transfer device, and, more particularly, to a thermal transfer device in which a print content to be printed onto a disk-shaped member is temporarily printed onto a transfer sheet, and then the print content of the transfer sheet is thermally transferred onto the disk-shaped member.

2. Description of the Related Art

Conventionally, in order to print a character, a figure, a pattern, or the like onto an optical recording medium such as a compact disk (CD-R) to which data can be written only once, an inkjet printer has been commonly used that is capable of printing a print content onto, for example, a label or the like of the optical recording medium without contacting the label.

The inkjet printer, which prints without contacting the label or the like of an optical recording medium, does not scratch the optical recording medium during printing, thus preventing it from affecting the optical recording medium in any way. However, the inkjet printer may cause ink smearing during printing, so that the print on the label or the like of an optical recording medium is smeared, preventing high quality printing from being performed.

Conventionally, such a problem has been overcome by using a thermal printer that prints onto, for example, a label of an optical recording medium, while the print head is in contact with the label. This provides a clean print on the label, thereby allowing good quality printing.

When a thermal printer is used to print a character, figure, pattern, or the like onto the label of an optical recording medium, the thermal head is kept in contact with the label. Therefore, the printing surface of the label of an optical recording medium should not be tilted with respect to the thermal head. When printing is performed with the printing surface tilted, good quality printing cannot be performed.

When such a known printing means as a thermal printer is used to print a character, a figure, a pattern or the like onto the label of an optical recording medium, any tilt of the printing surface of the label cannot be corrected since a suitable means for correcting the tilt of the printing surface has not yet been developed thus far. Therefore, when printing is performed with the printing surface of the label or the like of an optical recording medium tilted with respect to the thermal head, good quality printing cannot be performed.

SUMMARY OF THE INVENTION

To overcome the above-described problem, it is an object of the present invention to provide a thermal transfer device capable of providing good quality printing at all times as a result of forming a transferring portion by printing a character, a figure, a pattern, or the like onto a transfer sheet, and then thermally transferring the transferring portion onto a member.

To this end, according to the present invention, there is provided a thermal transfer device which uses a transfer sheet with a transferring portion formed by printing, and includes means for thermally transferring the transferring portion of the transferring sheet onto a member by transporting a tray carrying the transfer sheet and an opposing member to be subjected to transfer having the transfer sheet placed thereupon between a transfer roller and a transporting portion that are spaced apart from and face each other.

According to the above-described means, when printing a character, a figure, a pattern, or the like onto a member (being an optical recording medium), these are not directly printed onto the member. Instead, these are printed onto the transfer sheet to form a transferring portion that is thermally transferred onto the member, thus allowing good quality printing to be performed at all times.

According to a basic form of the present invention, the thermal transfer device comprises a transfer roller and a transporting portion that are spaced apart from and oppose each other; a heating member for heating a surface of the transfer roller; a tray for placing thereon a member, being an optical recording medium, to be subjected to transfer; and a transfer sheet with a transferring portion formed by printing, wherein the tray carrying the transfer sheet and the member to be subjected to transfer such that the transfer surface faces the member is transported between the transfer roller and the transporting portion with the transfer sheet in contact with the transfer roller, whereby the transferring portion of the transfer sheet is thermally transferred onto the member to be subjected to transfer.

Although not exclusive, the tray may include a transfer sheet holding portion.

Although not exclusive, the tray may include a transfer sheet peeling portion for automatically peeling off the transfer sheet from the member subjected to transfer, immediately after the tray has been transported.

Although not exclusive, the optical recording medium may be a recordable medium.

According to th e present invention, when printing a character, figure, pattern, or the like onto a member, these are not directly printed onto the member. Instead, the character, the figure, the pattern, or the like is printed onto the transfer sheet to form a transferring portion, after which the transfer sheet is placed onto the member to thermally transfer the transferring portion of the transfer sheet onto the member. The formation of the transferring portion by printing onto the transfer sheet can be performed using a known thermal transfer printer or the like that provides high quality printing. Thus, during thermal transfer of the transferring portion of the transfer sheet onto the m ember, the transferring portion produced by high-quality printing is transferred onto the member, so that good-quality printing can be performed on the member at all times.

In addition, according to the present invention, the tray is provided with a transfer sheet holding portion and/or transfer sheet peeling portion, so that when the tray is transported to the thermal transfer area for thermal transfer, shifting of the location of the transfer sheet and shifted transfer do not occur. Further, the transfer sheet can be automatically peeled off from the member to be subjected to transfer immediately after the thermal transfer, so that high quality thermal transfer can be performed.

Further, according to the present invention, thermal transfer is performed onto the member to be subjected to transfer (being an optical recording medium), so that breaking or deformation of a recording layer, which occurs when printing using a conventional thermal printer, does not occur.

DESCRIPTION OF THE PREFERRED EMBODIMENTS

A description will now be given of the preferred embodiments of the present invention, with reference to the drawings. The present invention, however, is not limited to the embodiments described below, so that various modifications can be made without departing from the gist of the present invention.

Figure 1A:
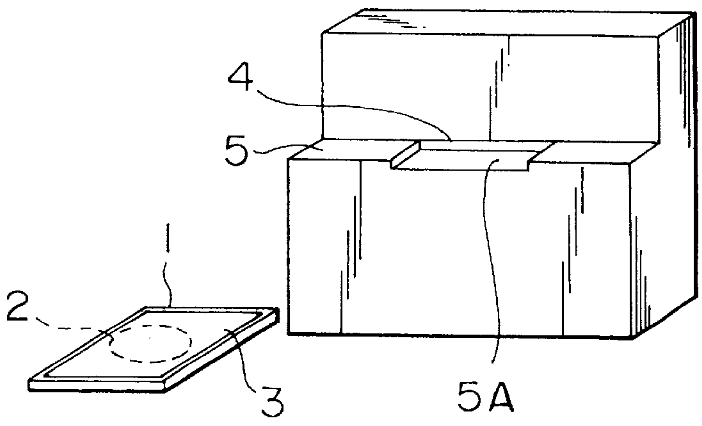
FIGS. 1A and 1B are structural views of an embodiment of a thermal transfer device in accordance with the present invention.
Figure 1B:
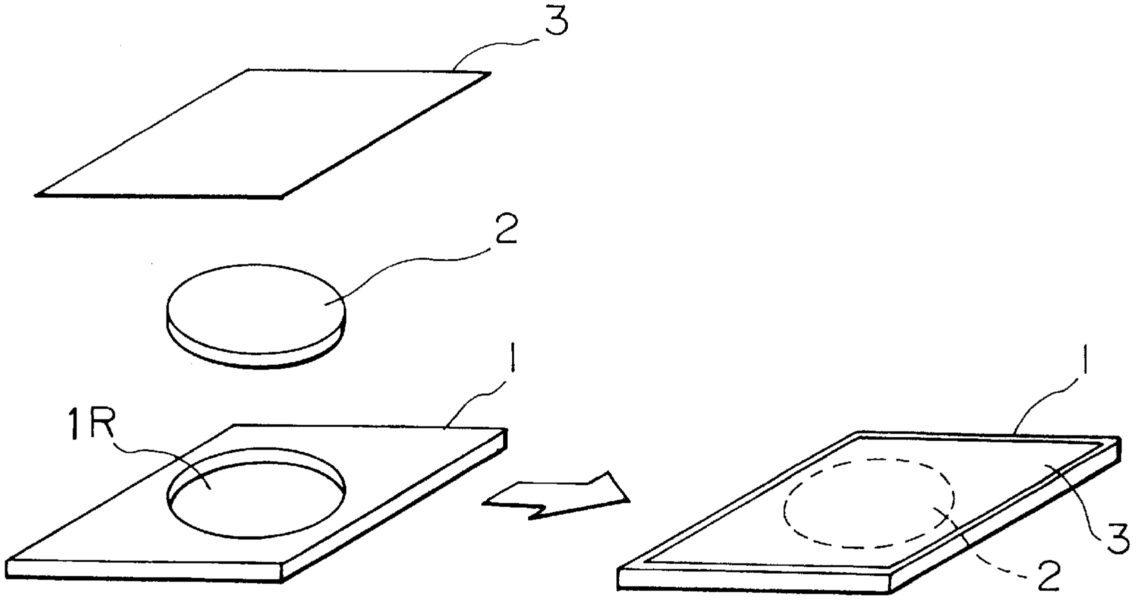

FIGS. 1A and 1B are views showing the structure of an embodiment of a thermal transfer device in accordance with the present invention. FIG. 1A is a perspective view showing the entire structure thereof, while FIG. 1B is a view showing the portion including a tray, a member to be subjected to transfer, and a transfer sheet. In this case, the member is a compact disk (CD-R) to which a character, figure, or the like can be written.

As can be seen in FIGS. 1A and 1B, the thermal transfer device is box-shaped as a whole. A step 5 is formed at the center front side thereof. A transporting groove 5A that connects to the tray-inserting opening 4 is formed in the step 5. A CD-R inserting-and-placing portion 1R is formed at about the center of the tray 1 used in the thermal transfer device. The CD-R 2 is placed into the CD-R inserting-and-placing portion IR, and a transfer sheet 3 is placed onto the CD-R 2 such that a transferring portion of the transfer sheet 3 and a transfer portion of the CD-R 2 contact each other. The transferring portion is formed by printing onto one of the surfaces of the transfer sheet 3 a character, a figure, a pattern, or the like to be transferred onto the transfer portion of the CD-R 2. Although not shown in FIG. 1A, a tray-ejecting opening is formed at the back side of the thermal transfer device.

In general, the thermal transfer device having the above-described structure operates in the following manner.

A transferring portion is formed by printing onto one of the surfaces of the transfer sheet 3 a character, a figure, a pattern, or the like to be transferred onto the transfer portion of the CD-R 2, using a thermal transfer printer or the like.

The CD-R 2 to be subjected to transfer set at the CD-R inserting-and-placing portion 1R of the tray 1 is placed therein. The transfer sheet 3 with the transferring portion is placed onto the CD-R 2 such that the transferring portion contacts the transfer portion of the CD-R 2 and such that the transferring portion is aligned with the transfer portion.

Then, the tray 1 carrying the CD-R 2 having superimposed thereon the transfer sheet 3 is inserted past the transporting groove 5A of the thermal transfer device and into the thermal transfer device from the tray-inserting opening 4.

Thereafter, as will be described in detail later, when the tray 1 is being transported through the transporting path from the tray-inserting opening 4 and into a thermal transfer area, the transferring portion of the transfer sheet 3 is thermally transferred onto the transfer portion of the CD-R 2, followed by removal of the tray 1 from the tray-ejecting opening not shown in FIG. 1A.

Figure 2A:
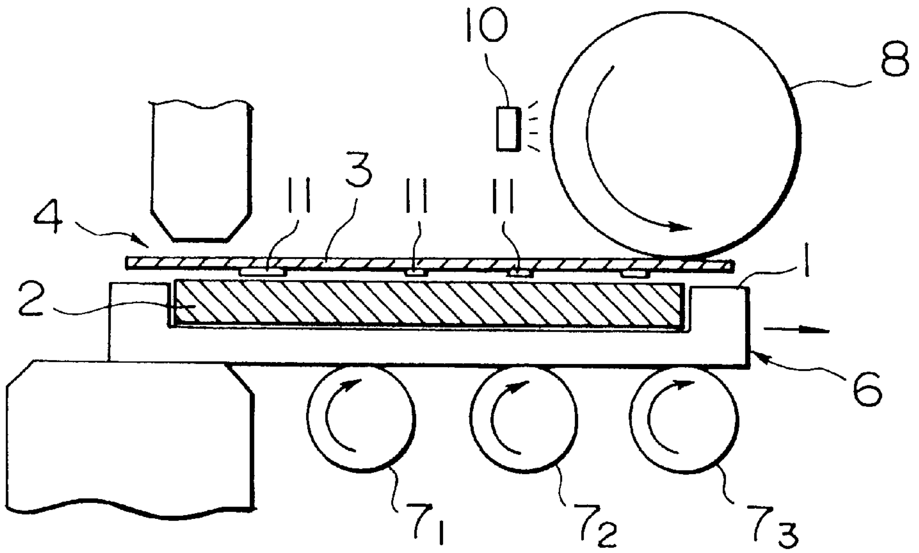
FIGS. 2A and 2B are sectional views of the structure of the main portion of the thermal transfer device of FIG. 1.
Figure 2B:
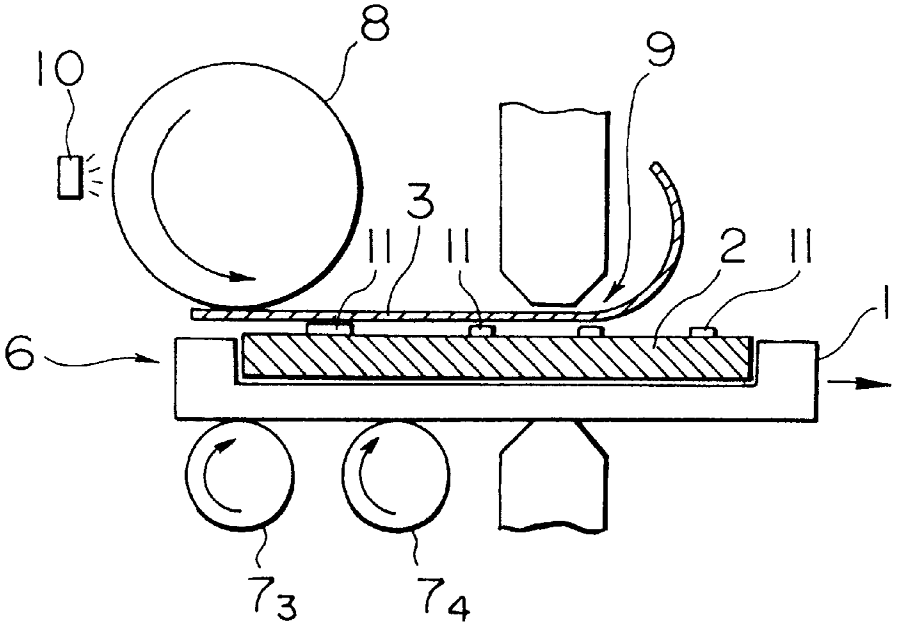

FIGS. 2A and 2B are sectional views showing the structure of the main portion of the thermal transfer device of FIG. 1A. FIG. 2A shows the condition of the thermal transfer device immediately after the arrival of the tray 1 at the thermal transfer area. FIG. 2B shows the condition of the thermal transfer device just before the tray 1 leaves the thermal transfer area.

As can be seen in FIGS. 2A and 2B, the lower portion of a transporting path 6 through which the tray 1 is transported is defined by a plurality of transporting rollers, with four transporting rollers designated $\mathbf{7}_1$, $\mathbf{7}_2$, $\mathbf{7}_3$, and $\mathbf{7}_4$ used in the present embodiment. The upper portion thereof is defined by one transfer roller 8 opposing and spaced from, for example, the transporting roller $\mathbf{7}_3$. The tray-inserting opening 4 is provided at the leading end thereof, whereas the tray-ejecting opening 9 is provided at the trailing end thereof. A heating portion 10 is placed near a side surface of the transfer roller 8 to heat the surface of the transfer roller 8 by heat generated as a result of driving. The transfer sheet 3 has applied on one face thereof ink 11 corresponding to the transferring portion formed by printing using a thermal transfer printer. Other component parts of FIGS. 2A and 2B that correspond to those of FIGS. 1A and 1B are given the same reference numerals.

The main structural portion of the thermal transfer device with the above-described structure operates as follows.

When the tray 1 carrying the CD-R 2 having superimposed thereon the transfer sheet 3 is inserted into the thermal transfer device from the tray-inserting opening 4, the tray 1 is transported into the thermal transfer device, that is towards the right in the direction of the arrow of FIG. 2A, by means of the transporting rollers at the lower side of the transfer path 6, that is, first, by the first transporting roller $\mathbf{7}_1$, then by means of the first transporting roller $\mathbf{7}_1$ and the second transporting roller $\mathbf{7}_2$, and then as shown in FIG. 2A by the first transporting roller $\mathbf{7}_1$, the second transporting roller $\mathbf{7}_2$, and the third transporting roller $\mathbf{7}_3$. Thereafter, the tray 1 passes through the thermal transfer area formed between the transfer roller 8 and the third transporting roller $\mathbf{7}_3$ in the transporting path 6, where the transfer roller 8 whose surface has been heated by the heating portion 10 presses and contacts the transfer sheet 3. The heating and the pressing causes the ink 11 on the transfer sheet 3 to be thermally transferred onto the CD-R 2, that is the transferring portion of the transfer sheet to be thermally transferred onto the CD-R 2.

The tray 1 at the thermal transfer area after thermal transfer, as shown in FIG. 2B, is continuously transported through the transporting path 6 by means of the third transporting roller $\mathbf{7}_3$ and the fourth transporting roller $\mathbf{7}_4$ toward the right in the direction of the arrow of FIG. 2B, followed by ejection of the tray 1 from the tray-ejecting opening 9. After ejection of the tray 1, the operator removes the transfer sheet 3 with his hand in order to remove the CD-R 2 from the CD-R inserting-and-placing portion 1R of the tray 1. The resulting CD-R is one in which the transferring portion of the transfer sheet 3 is thermally transferred onto the transfer portion of the CD-R 2.

Thus, according to the present embodiment, when printing is performed on a member to be subjected to transfer (the member being an optical recording medium), thermal transfer is performed through a transfer sheet, so that breaking or deformation of the recording layer, which occurs when printing is performed using a conventional thermal printer, does not occur.

Figure 3:
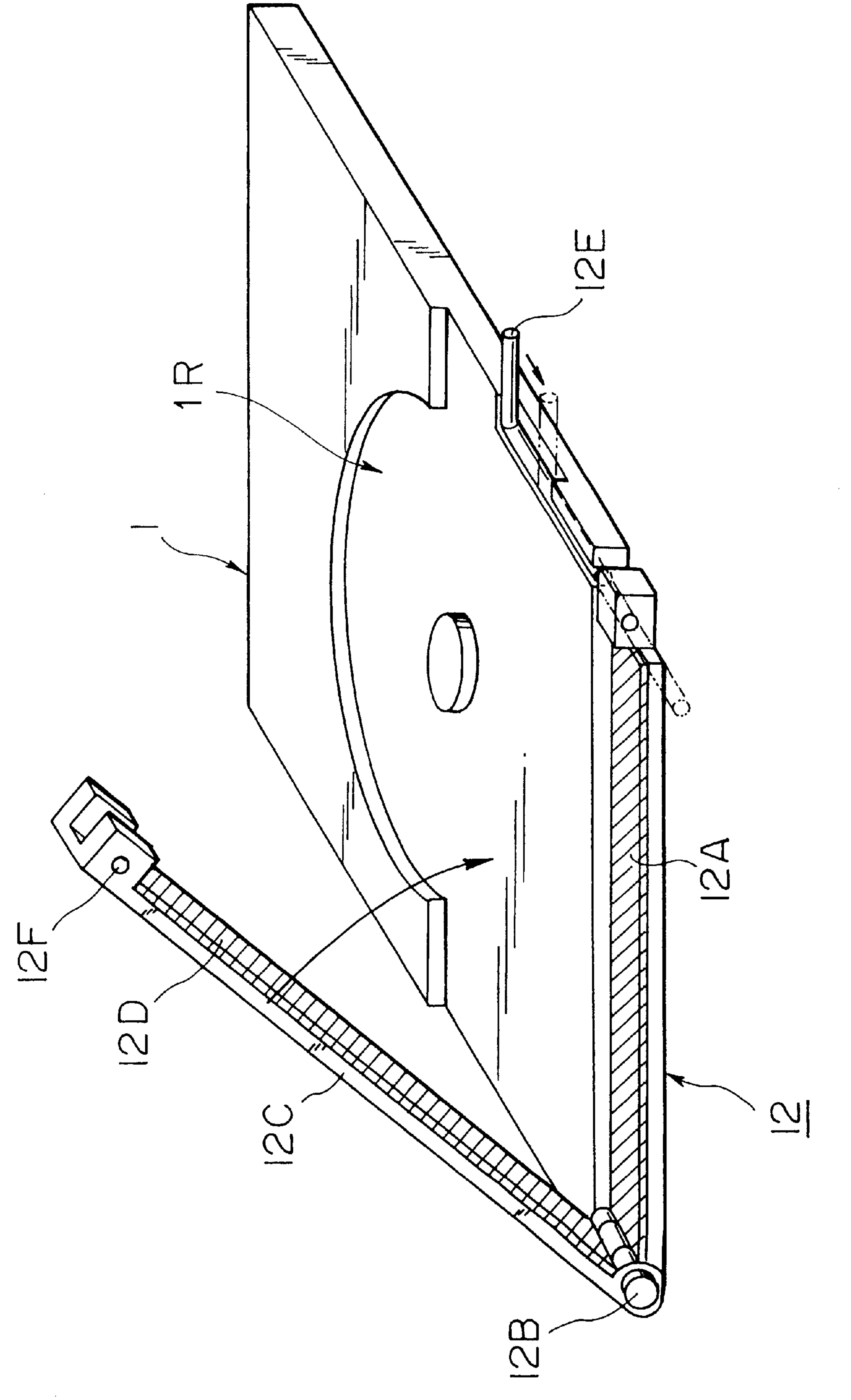
FIG. 3 is a perspective view of the structure of a first example of a tray used in the thermal transfer device of FIG. 1.

FIG. 3 is a perspective view of the structure of a first example of the tray 1 used in the thermal transfer device of the present embodiment.

As shown in FIG. 3, the tray 1 of the first example includes a transfer sheet holding portion 12 at one side edge thereof, in addition to a CD-R inserting-and-placing portion 1R at substantially the center portion thereof. Here, the transfer sheet holding portion 12 includes a first pad 12A made of silicone rubber or the like that is bonded to one side edge of the tray 1, a rotation pin 12B disposed at a side of the one side edge of the tray 1, a holding arm 12C rotatable about the rotation pin 12B as a shaft and being of substantially the same length as the length of the one side edge of the tray 1, a second pad 12D made of silicone rubber or the like that is bonded to the holding arm 12C so as to face the tray 1, a holding lever 12E formed so as to be slightly movable along a peripheral edge of the tray 1, and a lever receiving portion 12F provided at an end of the holding arm 12C that rotates such that the front end of the lever 12E can be inserted in the receiving portion 12F.

When a CD-R 2 is placed on the tray 1 of the first example, and a transfer sheet 3 is placed onto the CD-R 2, the holding lever 12E is moved towards the center portion of the tray 1 to move the front end of the holding lever 12E out the lever receiving portion 12F, as shown by the solid line of FIG. 3, allowing the holding arm 12C to be rotated upward (or away from the tray 1) about the rotation pin 12B as a shaft, as shown in FIG. 3. In this condition, the CD-R 2 aligned with the CD-R inserting-and-placing portion 1R is placed therein. Then, the transfer sheet 3 that has been similarly aligned is placed on the CD-R 2 such that its transferring portion contacts the transfer portion of the CD-R 2. Afterwards, the holding arm 12C is rotated downward towards the tray 1 about the rotation pin 12B as a shaft to clamp one side edge of the transfer sheet 3 by the first pad 12A provided at the tray 1 and the second pad 12D provided at the holding arm 12C. Moving the holding lever 12E towards the one side edge of the tray 1 and fitting the front end of the holding lever 12E into the lever receiving portion 12F causes the transfer sheet 3 to be held by the tray 1 (CD-R 2), thus preventing the transfer sheet 3 from falling off the tray (CD-R 2) or shifting of the transfer sheet 3 with respect to the tray (CD-R 2), during thermal transfer.

Although the tray 1 of the first example is provided with a disk-shaped protrusion (not designated with a reference number) for fitting the center hole of the CD-R 2 therearound when placing the CD-R 2 into the CD-R inserting-and-placing portion 1R, depending on the form of the recording medium to be placed onto the tray 1, the shape of the protrusion may be changed or the protrusion may be eliminated.

Thus, according to the thermal transfer device of the present embodiment, when printing a character, a figure, a pattern or the like onto the transfer portion of the CD-R 2, these are not directly printed onto the CD-R 2. Instead, the character, the figure, the pattern or the like is printed onto the transfer sheet 3, forming a transferring portion. Then, the transfer sheet is placed on the transfer portion of the CD-R 2 to thermally transfer the transferring portion of the transfer sheet 3 onto the transfer portion of the CD-R 2. Accordingly, since the transferring portion of the transfer sheet 3 can be produced by printing with a known thermal transfer printer or the like that provides good quality printing, when the transferring portion of the transfer sheet 3 is thermally transferred onto the transfer portion of the CD-R 2, the transferring portion formed by high quality printing is transferred onto the transfer portion of the CD-R 2, allowing high quality printing to be performed with respect to the transfer portion of the CD-R 2 at all times.

Since the tray 1 of the first example has a transfer sheet holding portion 12, the use of the tray 1 of the first example makes it possible to prevent a shift in the location of the transfer sheet 3 as well as shifted transfer, when the tray 1 of the first example is transported through the thermal transfer area to perform thermal transfer.

When the transfer sheet 3 is to be peeled off from the CD-R 2, after thermally transferring the transferring portion of the transfer sheet 3 onto the transfer portion of the CD-R 2, the portion including the CD-R 2 and the transfer sheet 3 is at a relatively high temperature just after thermal transfer. This may cause burns when trying to peel off the transfer sheet 3 from the CD-R 2 with the hand, thereby making it difficult to peel off the transfer sheet 3 with bare hands.

Figure 4:
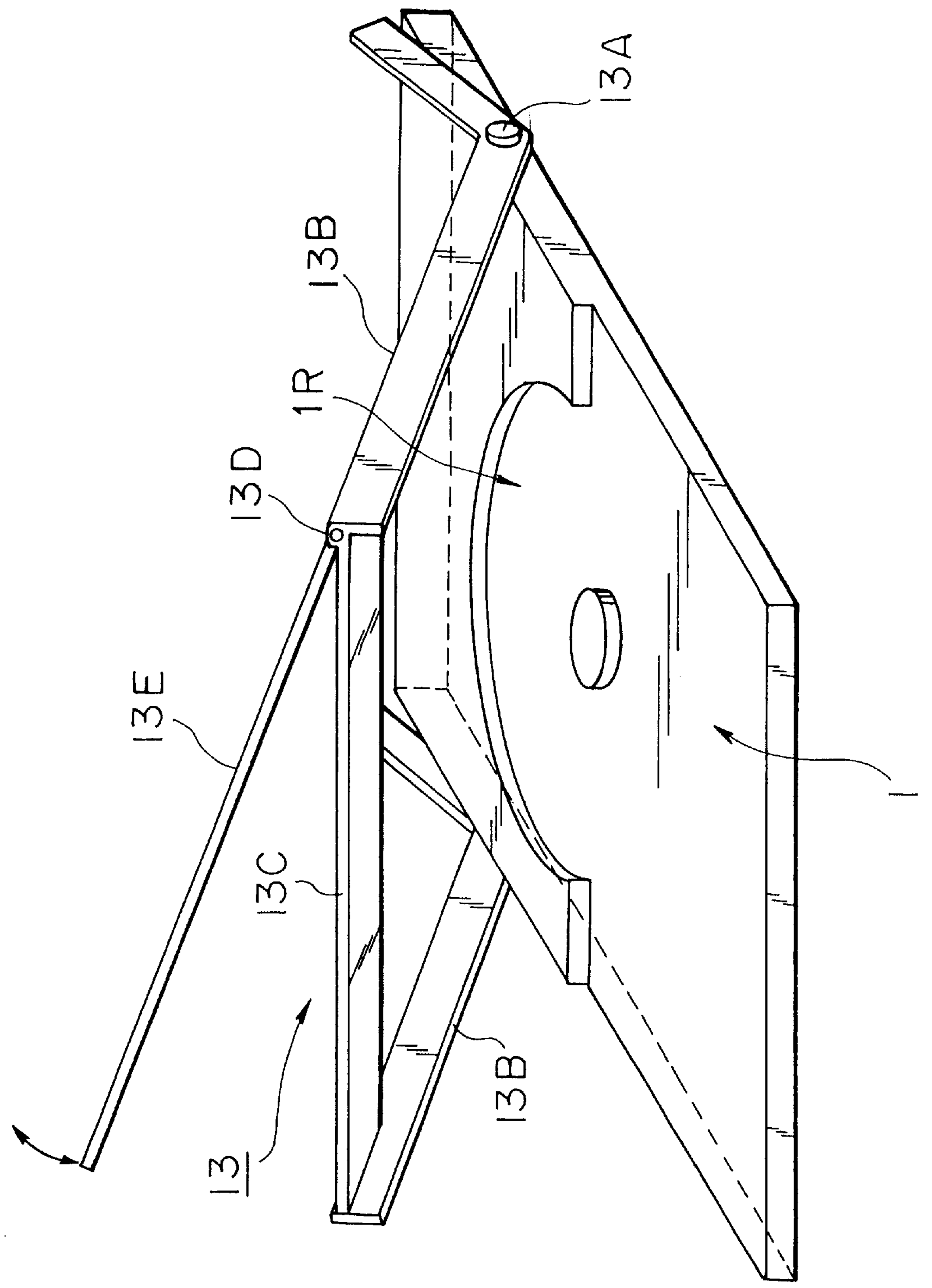
FIG. 4 is a perspective view of the structure of a second example of a tray used in the thermal transfer device of FIG. 1.

FIG. 4 is a perspective view of the structure of a second example of the tray 1 for use in the thermal transfer device of the present embodiment. It is constructed to allow the transfer sheet 3 to be automatically peeled off from the CD-R 2 immediately after thermal transfer.

As shown in FIG. 4, the tray 1 of the second example includes a CD-R inserting-and-placing portion 1R and a transfer sheet holding portion-and-transfer sheet peeling portion 13. Here, the transfer sheet holding portion-and-transfer sheet peeling portion 13*a* includes a pair of sheet peeling arms 13B, a holding plate 13C formed between each end of the pair of the sheet peeling arms 13B, a rotation pin 13D provided at an end of one of the sheet peeling arms 13B, and a holding arm 13E rotatable about the rotation pin 13D as a shaft and being of the same length as the length of a side edge of the tray 1. Each sheet peeling arm 13B is bent at an obtuse angle so as to be rockable about its corresponding rocking pin 13A as a shaft center.

When a CD-R 2 is to be placed on the tray 1 of the second example, and a transfer sheet 3 is to be placed thereon, the holding plate 13C disposed between the ends of the pair of sheet peeling arms 13B is moved downward to contact the lower surface of the holding plate 13C with a side edge of the tray 1. Then, as shown in FIG. 4, the holding arm 13E is rotated upward away from the tray 1 about the rotation pin 13D as a shaft. In this condition, the CD-R 2 aligned with the location of the CD-R inserting-and-placing portion 1R is placed therein, after which the transfer sheet 3 aligned similarly is placed on the CD-R 2 such that its transferring portion contacts the transfer portion of the CD-R 2. Then, the holding arm 13E is rotated downward towards the tray 1 about the rotation pin 13D as a shaft to clamp a side edge of the transfer sheet 3 by means of the first pad (not shown) provided at the upper surface of the holding plate 13 and the second pad (not shown) provided at the lower surface of the holding arm 13E. This causes the transfer sheet 3 to be held by the tray 1 (CD-R 2), thereby preventing the transfer sheet 3 from falling off the tray (CD-R 2) as well as shifting of the transfer sheet 3 with respect to the tray (CD-R 2), during thermal transfer.

Figure 5A:
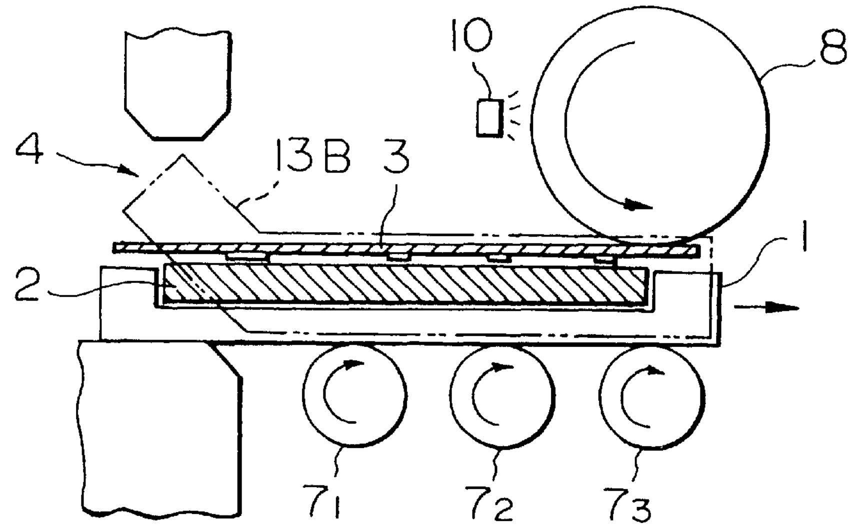
FIGS. 5A and 5B are sectional views of the structure of the main portion of the thermal transfer device when thermal transfer is carried out using the tray of FIG. 4.
Figure 5B:
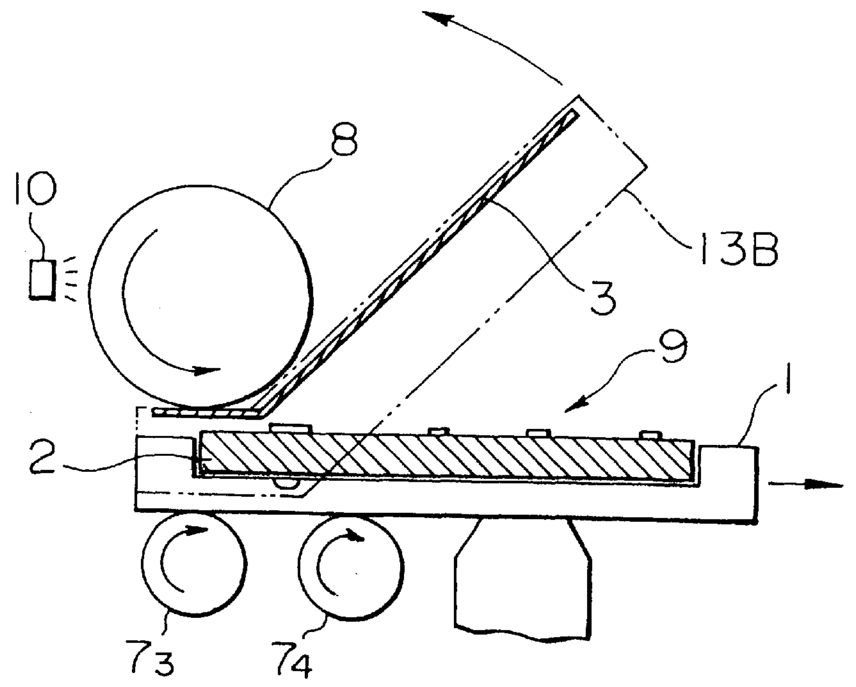

FIGS. 5A and 5B are sectional views showing the main structural portion of the thermal transfer device for performing thermal transfer using the tray 1 of the second example shown in FIG. 4. FIG. 5A shows the thermal transfer device immediately after the tray 1 has reached the thermal transfer area, while FIG. 5B shows the thermal transfer device just before the tray 1 leaves the thermal transfer area.

In FIGS. 5A and 5B, corresponding parts to those of FIGS. 1A and 1B, FIGS. 2A and 2B, and FIG. 4 are given the same reference numerals.

The main structural portion of the thermal transfer device of FIGS. 5A and 5B differs from that of FIGS. 2A and 2B in that the width of the tray-inserting opening 4 and the tray-ejecting opening 9 is made larger as a result of the use of a tray 1 with a different shape, which causes the tray 1 of the second example to actually have a larger height than that of the tray 1 of the first example. Other than that, the main structural portion of the thermal transfer device of FIGS. 5A and 5B does not differ from the main structural portion of the thermal transfer device of FIGS. 2A and 2B.

The main structural portion of the thermal transfer device with the above-described structure operates as follows.

When the tray 1 of the second example carrying a CD-R 2 having a transfer sheet 3 placed thereon is inserted into the thermal transfer device from the tray-inserting opening 4, starting from the holding arm 13E side portion of the tray 1, the tray 1 of the second example is transported into the thermal transfer device in the direction of the arrow in FIG. 5 by means of transporting rollers at the lower side portion of the transporting path 6, that is, first, by a transporting roller $\mathbf{7}_1$, then by the first transporting roller $\mathbf{7}_1$ and a second roller $\mathbf{7}_2$, and then by the first transporting roller $\mathbf{7}_1$, the second transporting roller $\mathbf{7}_2$, and a third transporting roller $\mathbf{7}_3$, as shown in FIG. 5A. Thereafter, when the tray 1 of the second example passes through the thermal transfer area of the transporting path 6 that is located between a transfer roller 8 and the third transporting roller $\mathbf{7}_3$, the transfer roller 8 whose surface has been heated by a heating portion 10 presses and contacts the transfer sheet 3. The heating and pressing causes the ink 11 on the transfer sheet 3 to be thermally transferred onto the CD-R 2 side, that is the transferring portion of the transfer sheet to be thermally transferred onto the CD-R 2, as has been the case in the foregoing description when the tray 1 of the first example was used.

The tray 1 of the second example in the thermal transfer area after thermal transfer continues to pass through the transporting path 6. As shown in FIG. 5B, when the tray 1 is being transported by means of the third transporting roller $\mathbf{7}_3$ and a fourth transporting roller $\mathbf{7}_4$, the transfer roller 8 which has been pressing the longer side portions of the bent pair of sheet peeling arms 13B starts to press down on the shorter side portions of the bent pair of sheet peeling arms 13B. This causes the shorter side portions that have been oriented upward to rock downward about their respective rocking pins 13A as shaft centers to the surface of the tray 1. When this occurs, the longer side portions rock upward, as shown in FIG. 5B, causing the transfer sheet 3 clamped between the first pad at the upper surface of the holding plate 13C and the second pad at the lower surface of the holding arm 13E to move upward at the same time, whereby the transfer sheet 3 is automatically peeled off from the CD-R 2. With the transfer sheet 3 peeled off, the tray 1 of the second example is ejected out from the tray-ejecting opening 9. Then, the CD-R 2 is taken out from the CD-R inserting-and-placing portion 1R of the ejected tray 1 of example 2. The resulting CD-R 2 is one in which the transferring portion of the transfer sheet 3 is thermally transferred onto its transfer portion.

Thus, since the tray 1 of the second example is provided with a transfer sheet holding portion-and-transfer sheet peeling portion 13, the thermal transfer device using the tray 1 of the second example is not only effective in preventing shifts in the location of the transfer sheet as well as shifted transfer as has been the case with the thermal transfer device using the tray 1 of the first example, but is also effective in allowing automatic peeling off of the transfer sheet 3 from the CD-R 2 immediately after thermal transfer, thereby allowing a high-quality thermal transfer.

Although in the foregoing description, the member to be subjected to transfer, being an optical recording medium, was a CD-R, it is obvious that other members equivalent or similar to a CD-R may also be used. Examples thereof include optical recording media such as a re-writable compact disk (CD-E), or a recordable digital video disk (DVD-R, DVD-RAM).

In addition, although in the foregoing description, a plurality of transporting rollers $\mathbf{7}_1$, $\mathbf{7}_2$, $\mathbf{7}_3$, and $\mathbf{7}_4$ were used in the transporting portion, only one transporting roller may be used instead. Further, other transporting means such as a transporting belt may also be used.

As can be understood from the foregoing description, according to the present invention, when printing a character, figure, pattern, or the like onto a member, these are not directly printed onto the member. Instead, the character, the figure, the pattern, or the like is printed onto the transfer sheet to form a transferring portion, after which the transfer sheet is placed onto the member to thermally transfer the transferring portion of the transfer sheet onto the member. The formation of the transferring portion by printing onto the transfer sheet can be performed using a known thermal transfer printer or the like that provides high quality printing. Thus, during thermal transfer of the transferring portion of the transfer sheet onto the member, the transferring portion produced by high-quality printing is transferred onto the member, so that good-quality printing can be performed on the member at all times.

In addition, according to a preferred form of the present invention, the tray is provided with a transfer sheet holding portion and/or transfer sheet peeling portion, so that when the tray is transported to the thermal transfer area for thermal transfer, shifting of the location of the transfer sheet and shifted transfer do not occur. Further, the transfer sheet can be automatically peeled off from the member to be subjected to transfer immediately after the thermal transfer, so that high quality thermal transfer can be performed.

What is claimed is:

1. A thermal transfer device, comprising:

a transfer roller and a transporting portion that are spaced apart from and oppose each other;

a heating member for heating a surface of said transfer roller;

a tray comprising a recessed section for placing thereon a member, being an optical recording medium, to be subjected to transfer; and a transfer sheet with a transferring portion formed by printing, wherein said tray carries said transfer sheet and said member to be subjected to transfer such that said transfer sheet faces said member while being transported between said transfer roller and said transporting portion with said transfer sheet in contact with said transfer roller, whereby said transferring portion of said transfer sheet is thermally transferred onto said member to be subjected to transfer.

2. A thermal transfer device according to claim 1, wherein said tray comprises a transfer sheet holding portion that comprises a holding arm that is rotatably attached to said tray.

3. A thermal transfer device according to claim 2, wherein said tray comprises a transfer sheet peeling portion for automatically peeling off said transfer sheet from said member to be subjected to transfer immediately after said tray has been transported.

4. A thermal transfer device according to claim 2, wherein said tray comprises a shaft to which said holding arm is rotatably attached.

5. A thermal transfer device according to claim 1, wherein said optical recording medium is a recordable medium; and said transfer sheet comprises a transfer surface that is heat transferred to a surface opposite of a recording surface of said optical recording medium.

6. A thermal transfer device according to claim 5, wherein said optical recording medium comprises a compact disk.

7. A thermal transfer device according to claim 5, wherein said optical recording medium comprises a rewritable compact disk.

8. A thermal transfer device according to claim 5, wherein said optical recording medium comprises a recordable digital video disk.

9. A thermal transfer device according to claim 1, wherein said recess is formed in a central portion of said tray.

10. A thermal transfer device according to claim 1, wherein said optical recording medium comprises a compact disk.

11. A thermal transfer device according to claim 1, wherein said optical recording medium comprises a rewritable compact disk.

12. A thermal transfer device according to claim 1, wherein said optical recording medium comprises a recordable digital video disk.

13. A thermal transfer device, comprising:

a transfer roller and a transporting portion that are spaced apart from and oppose each other;

a heating member for heating a surface of said transfer roller;

a tray for placing thereon a member, being an optical recording medium, to be subjected to transfer; and a transfer sheet with a transferring portion formed by printing, wherein said tray carries said transfer sheet and said member to be subjected to transfer such that said transfer sheet faces said member while being transported between said transfer roller and said transporting portion with said transfer sheet in contact with said transfer roller, whereby said transferring portion of said transfer sheet is thermally transferred onto said member to be subjected to transfer; and wherein said tray comprises a transfer sheet peeling portion for automatically peeling off said transfer sheet from said member to be subjected to transfer immediately after said tray has been transported.

14. A thermal transfer device according to claim 13, wherein said tray further comprises a transfer sheet holding portion.

15. A thermal transfer device according to claim 13, wherein said optical recording medium comprises a compact disk.

16. A thermal transfer device according to claim 13, wherein said optical recording medium comprises a rewritable compact disk.

17. A thermal transfer device according to claim 13, wherein said optical recording medium comprises a recordable digital video disk.

* * * * *